Oct. 2, 1923.

H. D. WOOTTON 1,469,569

CAMERA MORE PARTICULARLY FOR USE IN AERIAL PHOTOGRAPHY

Filed Dec. 29, 1922

Oct. 2, 1923. 1,469,569
H. D. WOOTTON
CAMERA MORE PARTICULARLY FOR USE IN AERIAL PHOTOGRAPHY
Filed Dec. 29, 1922 8 Sheets-Sheet 2

Fig 2

Oct. 2, 1923.   1,469,569
H. D. WOOTTON
CAMERA MORE PARTICULARLY FOR USE IN AERIAL PHOTOGRAPHY
Filed Dec. 29, 1922   8 Sheets-Sheet 4

Oct. 2, 1923. 1,469,569
H. D. WOOTTON
CAMERA MORE PARTICULARLY FOR USE IN AERIAL PHOTOGRAPHY
Filed Dec. 29, 1922   8 Sheets-Sheet 6

Oct. 2, 1923.

H. D. WOOTTON 1,469,569

CAMERA MORE PARTICULARLY FOR USE IN AERIAL PHOTOGRAPHY

Filed Dec. 29, 1922    8 Sheets-Sheet 7

Oct. 2, 1923.

H. D. WOOTTON 1,469,569

CAMERA MORE PARTICULARLY FOR USE IN AERIAL PHOTOGRAPHY

Filed Dec. 29, 1922     8 Sheets-Sheet 8

Patented Oct. 2, 1923.

1,469,569

UNITED STATES PATENT OFFICE.

HERBERT D. WOOTTON, OF LONDON, ENGLAND.

CAMERA MORE PARTICULARLY FOR USE IN AERIAL PHOTOGRAPHY.

Application filed December 29, 1922. Serial No. 609,610.

*To all whom it may concern:*

Be it known that I, HERBERT DARLOW WOOTTON, a subject of the King of Great Britain, residing at Royston, Stanley Road, South Woodford, London, E. 18, England, have invented certain new and useful Improvements in or Relating to Cameras More Particularly for Use in Aerial Photography, of which the following is a specification.

This invention relates to improvements in cameras more particularly for use in aerial photography or where it is desired to take a series of pictures in succession and has for its object a construction in which the plates to be exposed are successively brought into the focal plane of the camera and removed therefrom.

A further feature of the invention consists in a construction of camera which may be employed in carying out surveys, in which the data required is automatically recorded by the camera, such information as barometer readings, altitude, inclination and other technical information being recorded simultaneously with the exposure of the plates.

According to the general principle of the invention, the camera is constructed for use with any given number of the kind wherein the plates which are mounted in pile formation in a change box or rotary carrier rotatably mounted within the body of the camera and mechanism is provided for rotating said change box or rotary carrier so that each plate of the pile is successively brought into the correct focal plane of the lens, for effecting the exposure of the plates, for again rotating the carrier, for withdrawing each plate successively from the front of the pile, and for replacing the same at the rear of the pile, so that the plates may be successively exposed until the whole of the plates have been dealt with. When a change box is employed, mechanism is provided whereby after the change box has been placed in the body of the camera, the end covers are successively removed from said change box and after the plates have all been exposed, the said covers are again automatically replaced so that the change box is ready for removal from the camera.

The driving mechanism for the carrier and the operating mechanism for the various parts of the apparatus may be operated by one or more electric motors geared to a fly-wheel or its equivalent rotating about a vertical or horizontal axis at the top or sides of the camera, and thus exerting a gyrostatic action in steadying the camera. Alternatively, the fly-wheel may form part of the motor. The mechanism may be driven from the motor or motors through worm gearing, and it is preferable to interpose a clutch mechanism, which may be magnetically operated if desired, between the driving and driven gears, means being provided for de-clutching when desired, which de-clutching may be effected electrically.

The invention also includes other details of construction and arrangement of parts hereinafter more particularly described.

In order that the invention may be readily understood, reference is made to the accompanying drawings, which show by way of example, a construction of camera according to the invention.

Figure 14^A is a similar view to Figure 13, showing the lever mechanism in another position.

Figure 14^B is a side view of the sliding spring controlled member seen at the right of Figure 13.

The apparatus comprises a casing or frame 40 provided at its forward end with an apertured front wall 41 within which the lens and any other parts may be mounted.

Figure 1:
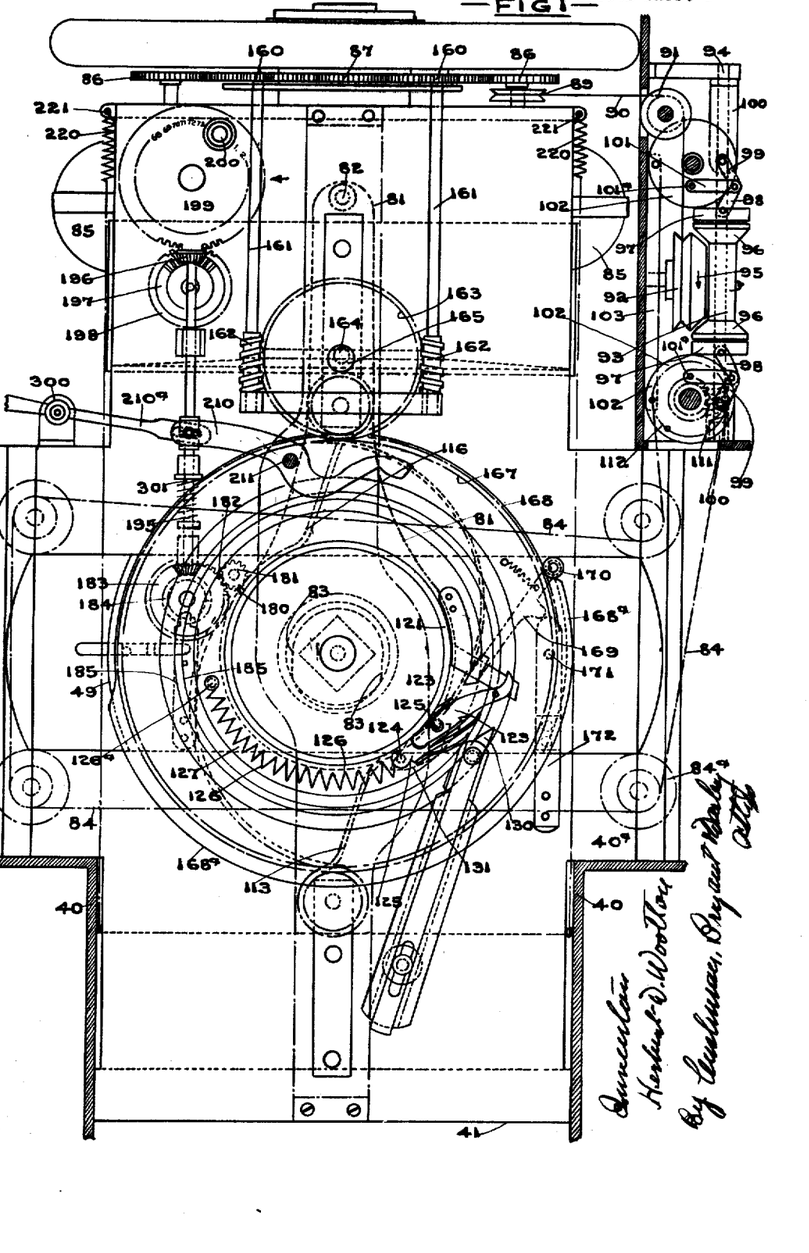
Figure 1 is an elevation of the camera, the casing being shown in section, and the front of the camera in which the lens is mounted is omitted.
Figure 2:
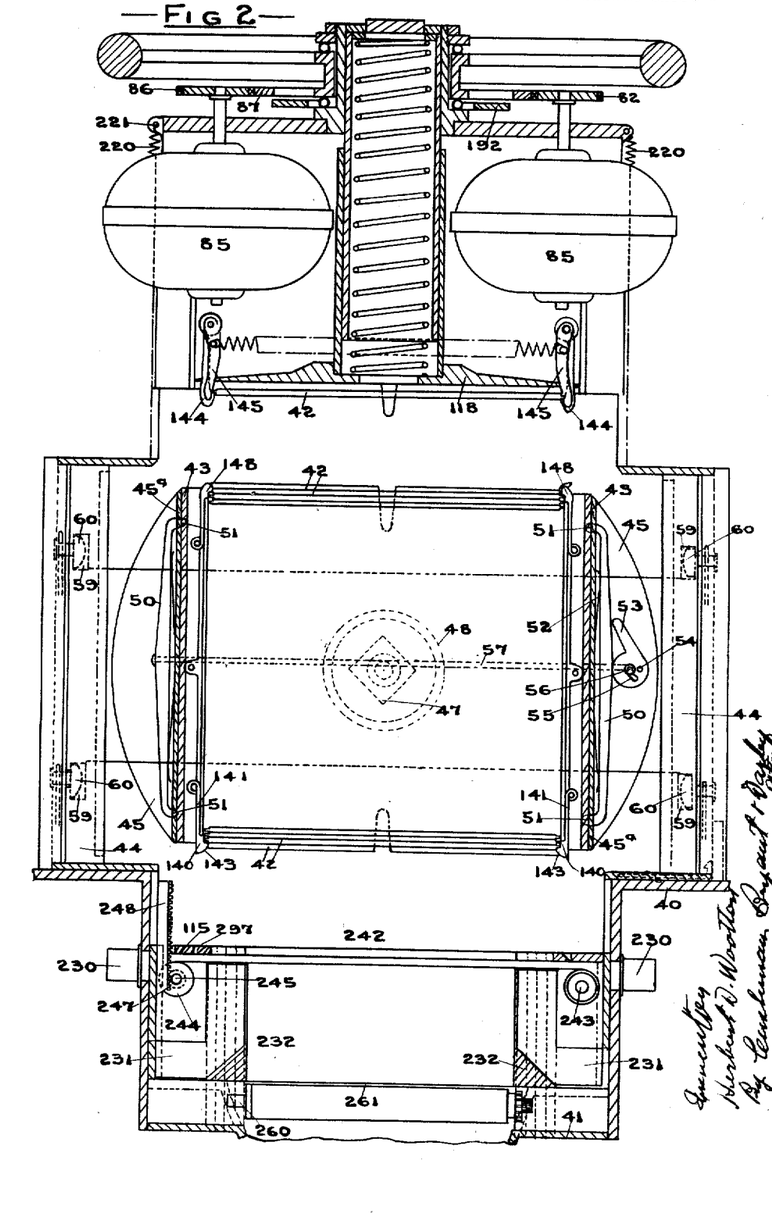
Figure 2 is a transverse vertical section through Figure 1.
Figure 3:
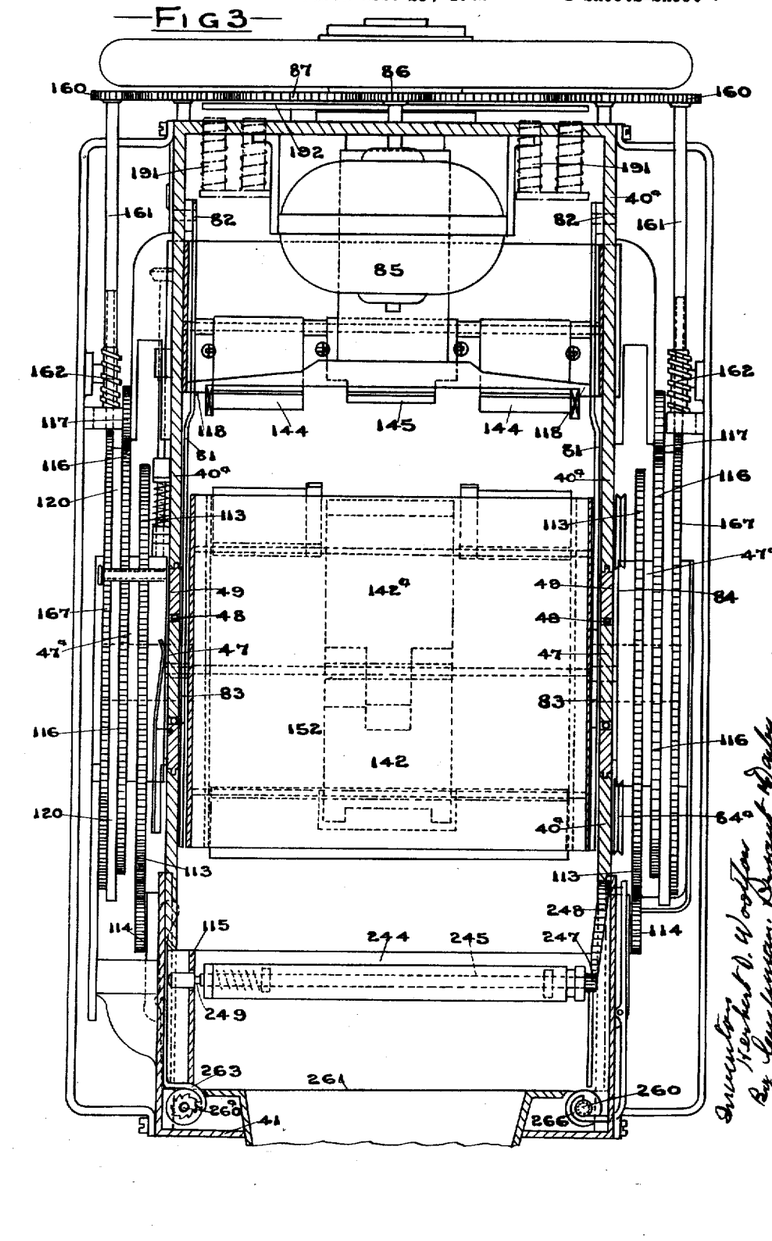
Figure 3 is a view in elevation with certain parts removed and with the outer casing and the rotary carrier shown in section.

The plates are each mounted in a sheath 42 and the sheaths are mounted in pile formation as shown in Figure 2, in a change box 43 which is provided with removable end covers or lids 44 see Figure 2 which are adapted to be removed and replaced by automatically operating means hereinafter described. The change box 43 is placed into the body of the camera and is supported therein by a rotary carrier 45 and this rotary carrier is provided with trunnion bearings in the form of discs or the like 47 mounted in ball bearings 48 in cross slides 49 (one on each side) adapted to slide in the walls 40^a of the frame or casing as shown in Figures 1–3 and 13.

The opposite walls 45^a of the plate carrier 45 are provided with movable members 50, each of which is provided in the neighbourhood of each end with a lip or flange 51 or its equivalent, said lips or flanges 51 being adapted at appropriate times, to project inwardly through the walls 45^a of the carrier 45, but are normally retained in the retracted position by blade springs 52, (see Figure 2). At the rear of the wall 45^a of the plate carrier 45 at one end is mounted a rotary cam member 53 pivotally supported on a pin or stud 54, the periphery of this cam 53 is adapted to bear against the outer face of the adjacent movable member 50 so that the said member may be moved inwardly against the action of the blade spring 52 to project the lips or flanges 51 thereon through the walls 40^a of the plate carrier 45 in order to engage the adjacent wall 45^a of the change box 43 when the same is in position in the carrier 45. The cam 53 is provided with a slot 55 in which is located a pin 56 which is connected by means of a rod or the like 57 to the sliding member 50 on the opposite side of the carrier 45 so that when the cam 53 is operated, the movable members 50 in the opposite walls are simultaneously projected inwardly to engage the change box 43 and retain same in position.

Figure 6:
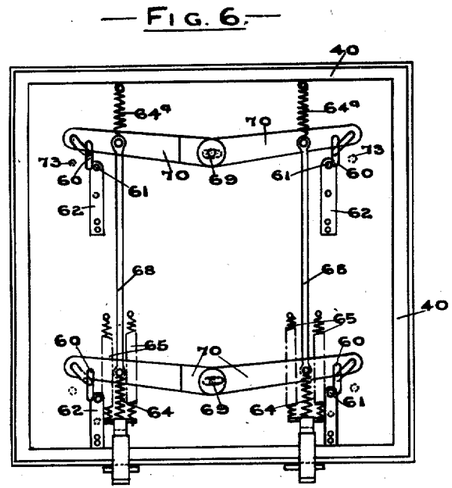
Figures 6 and 7 are elevation and horizontal section respectively showing the mechanism by means of which the covers for the removable change box are retained against the walls of the camera, the front plate of the mechanism being removed.
Figure 7:
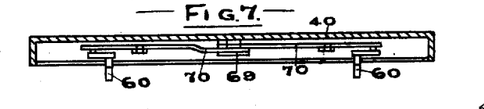

The end covers 44 of the change box 43 are provided with light tight slots or angular recesses 59 (Figure 15) and on the walls 40^a of the casing 40 of the camera are provided spring operated turnbuttons 60, see Figures 2–15 or their equivalent adapted when the covers 44 on the change box 43 are brought into engagement therewith to be released and spring operated to retain the covers 44 flat against the camera wall. This movement of the turnbuttons 60 is also adapted to effect the release of locking means for the end covers 44 of the change box 43 as hereinafter described. The turnbuttons 60 are each retained in position by a locking pin 61 (see Figure 6) mounted on a spring arm 62 which is adapted to be disengaged when the end cover 44 on the change box 43 is brought into close contact with the wall of the camera casing or frame 40. The slots 59 in the covers 44 when brought into this position register with the turnbuttons 60 which pass into the slots 59, and owing to the locking pins 61 being released, the turnbuttons 60 are turned through an angle of 90 degrees, releasing the covers 44 from the change box 43, and retaining the covers 44 against the camera walls. It is to be understood that similar turnbuttons 60 are provided on the diametrically opposite wall of the casing so that when the change box 43 is slidden in the opposite direction in the manner hereinafter described, the same operation is repeated with the cover 44 at the opposite end of the change box 43 the change box 43 being successively moved into close contact with the diametrically opposite walls of the casing or frame 40 by mechanism hereinafter described.

When the plates have been exposed, the sliding mechanism for the change box 43 is again brought into operation and the ends of the change box 43 are successively brought against the opposite walls of the casing or frame 40, the covers 44 are replaced and the change box 43 is again closed ready for removal and replacement.

Figure 8:
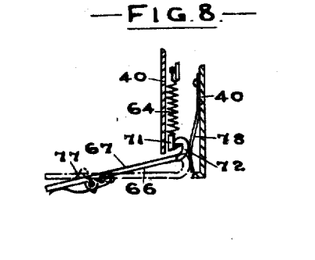
Figure 8 is a detail view of the mechanism operated by the movement of the change box within the camera for operating the retaining means.

The springs 64 and 64a controlling the movement of the turnbuttons 60 (Figure 6) are arranged in two sets one of which 64 operates the turnbuttons 60 to rotate them in one direction, whilst the other set 65 is brought into operation to rotate the turnbuttons 60 in the opposite direction to return the turnbuttons 60 to the normal position. This mechanism consists of a pair of fulcrumed levers 66. The levers 66 are normally in the position shown in Figure 8 and when the change box 43 is slidden into position, one end of each of the fulcrumed levers 66 is depressed, the change box 43 engaging the same at the point 67 thereby tensioning the springs 64 which tend to rotate the turnbuttons 60 from the position shown in Figure 6 to the dotted positions Figure 15. The turnbuttons 60 are however locked against rotation by the spring operated locking pins 61 (Figure 6) which are only released by the abutment against them of the outer surface of the covers 44 on the change box 43, this taking place after the turnbuttons have entered their respective slots 59. The two sides of the casing of the camera are similarly constructed in so far as the mechanism for removing and retaining the change box covers 44 is concerned, and the description of one will suffice to make it understood that the same operations take place on the opposite side of the casing 40 when the change box 43 is moved to the opposite side. As previously mentioned the spring 64 for operating the turnbuttons 60 to the locked position are tensioned as the change box 43 is slidden into position. The springs 64 are connected to one of a series of pivotal levers 70 arranged in pairs, each lever 70 of each pair being connected to the corresponding lever 70 of the other pair by a connecting rod 68. The levers 70 of each pair are interconnected pivotally at 69 so that when one lever is operated all the levers turn about their pivots to rotate the turnbuttons 60 connected thereto to a uniform extent. The levers 70 of the lower pair (Figure 6) each have one end of the operating spring 64 connected thereto and the opposite end of the spring is connected to a sliding catch 71 (see Figure 8) which is in engagement with a hook like portion 72 of the fulcrumed lever 66 which is operated by the sliding into position of the change box 43. When the change box 43 is slidden into position, these sliding catches 71 are pulled down to tension the springs 61 and connected thereto so that as soon as the locking pins 61 on the turnbuttons 60 are released, the latter are rotated by the tension of the springs acting on the lever system 68, 69, 70 (see Figure 6).

Figure 15:
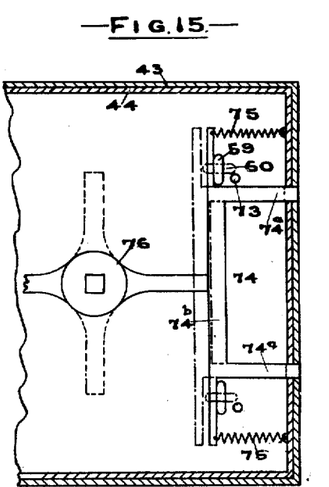
Figure 15 shows the mechanism by means of which the covers are secured to the ends of the change box.

Retaining pins 73 are provided on the change box covers 44 arranged in such positions as to limit the movement of the turnbuttons 60 in the locked position (Figure 15).

The change box covers 44 which overlap the box are provided, preferably on opposite sides with sliding bolts 74 which are adapted to be projected under the action of springs 75 into receptive slots in the edges of the change box covers 44, and these bolts each comprise a pair of parallel bars 74a connected together at their inner ends by a cross member 74b, the inner edge of which when said locking bars 74a are in the locked position lie closely adjacent the slots 59 for the reception of the turnbuttons 60. By this means, when the turnbuttons 60 are moved by their springs 64 to the locking position, the locking bars 74a are withdrawn so as to release the covers 44 from the change box 43.

In order to provide additional security against the end covers 44 becoming detached after the change box 43 has been withdrawn from the camera, each of the end covers 44 is provided with a rotary safety lock 76 adapted to be rotated by a key from outside the change box 43. The safety lock 76 when the change box 43 has been removed from the camera, is in the position shown in Figure 15, in which it prevents the withdrawal of the locking bars 74 from the change box 43, but when the change box 43 is being inserted into the camera the safety lock 76 is rotated by a suitable key (see dotted line Figure 15) through the angle of 90 degrees so that the locking bars 74 are free to be withdrawn by the rotation of the turnbuttons 60 as already described. The change box 43 is then slidden successively to the opposite sides of the camera casing and the turnbuttons 60 are operated to remove the cover 44 and the change box 43 is then returned to its normal central position ready for operation as hereinafter described. When the exposure of the plates has been completed, the operating mechanism for the change box 43 again comes into operation. During the movement of the change box 43 to one side from its central position, the front ends thereof make contact with a stop or projection 77 on the fulcrumed lever 66 which is now in the dotted position Figure 8 and imparts thereto a limited longitudinal movement against the action of the blade spring 78 which releases the sliding catch 71, and consequently the spring 64 which previously operated on the turnbuttons 60 to move them to the locking position, ceases to be under tension, and the top springs 64a together with springs 65 are now under tension and function to rotate the turnbuttons 60 in the reverse direction, so that when the end of the change box 43 comes up against the cover 44 thereof which is being held flat against the wall 40a of the casing of the camera, the turnbuttons 60 are released and the springs 45 now move the arms 70 to their normal position, the cranked end bringing the turnbuttons 60 to the unlocked position, the covers 44 being simultaneously again locked to the change box 43 by the return movement of the turnbuttons 60 which release the locking bars 74. The same operation takes place in connection with the opposite end of the change box 43, and when both covers have been reattached, the change box 43 is ready to be removed from the camera.

The lateral movement of the change box 43 may be effected by hand or automatically. In the former case, a handle 79 is provided which may be mounted externally of the casing as shown at 79 (Figure 13), or internally thereof, the handle being connected to sliding bars 80 on each side, which slide in a light tight manner in the inner walls of the casing.

When automatic means are provided for moving the change box 43, I provide a system of levers arranged in such a way as to ensure the change box 43 being moved in the correct alignment to prevent jambing. The levers comprise a pair of depending arms 81 (Figures 1 and 3) mounted within the main frame and pivoted thereto at 82 and behind the sliding plunger, said arms being slotted at 83 to enable the trunnion bearings of the rotary plate carrier to pass therethrough. The arms 81 are operated by cords, cables or the like 84 (Figure 1) winding and unwinding successively on a pair of drums 84ª or pulleys, the rotation of the drums or pulley 84ª being effected through intermittent gearing or by separate motor drive so that the drums 84ª are driven successively in opposite directions after a given time interval, which interval is set according to the number of plates mounted in the carrier or change box 43 mounted therein.

The means for moving the change box 43 to each side of the camera for the purpose of removing the covers 44 are constructed as follows:—

85, 85, are two motors, the shafts of which are provided with toothed pinions 86 which mesh with a toothed wheel 87 located centrally above the camera casing or preferably within the top of the casing. On the shaft of one of the motors is a grooved pulley 89 around which passes an endless driving cord or the like 90 passing over guide pulleys 91 and around a grooved pulley 92 which is thus driven in a constant direction.

Mounted adjacent the pulley 92 is a friction cone 93 slidably keyed to a shaft 94 mounted in suitable bearings. The pulley 92 is provided with a conical friction surface 95 on its outer side and the double cone 93 is provided at each end with co-operating conical friction surfaces 96, these latter friction surfaces being located at such a distance apart that either may be brought into engagement with the rotating pulley 92 by moving the cone 93 axially along its shaft. Loosely mounted on the shaft 94 at each end of the double cone 93 are collars 97. Pivoted to each of the collars are links 98 (Figures 1 and 12) in turn pivoted to a second link 99, the opposite end of which is pivotally connected to a bracket 100, and the links 98, 99 form a toggle mechanism through which the axial movement of the cone 93 is effected. The toggles are operated by levers 101 each connected at one end to an eccentric pin 101ª carried on a disc 102 and at its opposite end to the connecting pin between the corresponding links 98 and 99. The discs 102, 102 are connected together by a connecting rod or rods 103 so that when said rod 103 is raised, the disc 102, 102 will each rotate in a clockwise direction, as seen in Figure 1, to the same extent. By this means, as the shafts of the motors rotate in an anticlockwise direction when seen in plan, the friction pulley 92 will rotate in the direction indicated by the arrow in Figure 1, so that if the discs 102 are moved in a clockwise direction, the cone 93 will be moved downwardly so that the shaft 94 will rotate in the direction indicated by the arrow in Figure 1, and if the discs 102 are rotated in the opposite direction, the cone 93 will be moved upwardly and consequently the direction of drive of the shaft 94 will be reversed.

The friction cone clutch is operated by the following mechanism:—

Figure 13:
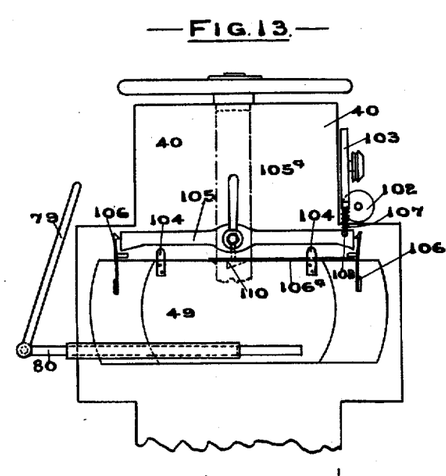
Figure 13 is a side elevation of a portion of the camera casing showing the mechanism for reversing the clutch illustrated in Figure 12.
Figure 14A:
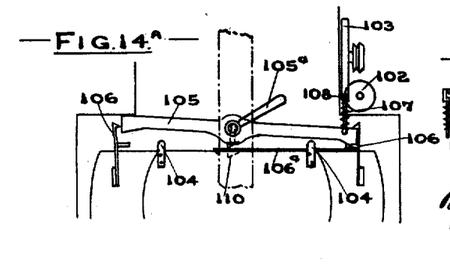
Figure 14B:
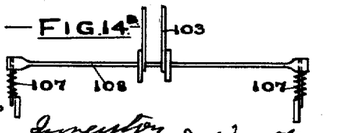

The slides 49 which carry the rotary carrier are provided, on each side with a projecting pin or the like 104 (Figures 13, 14ᴬ and 14ᴮ). The adjacent wall of the casing 40 is provided with a pivotal two-armed lever 105 the ends of which co-operate with spring catches 106 and are engaged thereby when the lever 105 is rocked in either direction. The catches are each provided with a projection which extends into the path of the pins 104 on the sliding member 49, so that as the latter moves to each end in its path of movement, the catches 106 are operated by the pins 104 in a manner hereinafter described. One end of the lever 105 is resiliently connected by means of a pivotal rod 107 to the end of a transverse bar 108 passing through the discs 102 so that when the lever 105 is rocked in opposite directions the clutch is operated to reverse the drive whilst when the lever 105 is in the position shown in Figure 13, declutching takes place, the double cone 93 being in the position shown in Figure 1. The cone clutch mechanism and the wall of the casing adjacent thereto may if desired be mounted closely adjacent the motors 85.

The drive to the grooved pulley 92 is constant. On the lever 105 being depressed, the cone 93 is operated and the drive is transmitted to the shaft 94, whereby one end of the cable or the like 84 will be wound on the drum 84ª and one end wound off, so that the sliding members 49 are moved towards one side of the casing. When the change box covers 44 are to be replaced, the lever 105 is rocked by the handle 105ª to the position shown in Figure 14A, and the sliding members 49 commence their movement to the right. When the sliding members 49 shown central in Figure 13 reach the end of their movement to the right (Figure 14A and Figure 13) the lever 105 is rocked to the position opposite to that shown in Figure 14A, the catch 106 being first released by the pin 104 which then engages the cam surface on the lower side of the end of the lever 105, so that the end of the lever 105 to the left in Figure 14A is now retained by the catch 106 and the clutch cone 93 is reversed, reversing the drive to the drums 84ª and thus moving the sliding members 49 in the reverse direction towards the opposite wall of the casing, that is to the left of Figure 14A. On the sliding members reaching the end of their movement in this direction, the lever 105 is again reversed to the position shown in Figure 14A, and the clutch cone 93 is also reversed. As the sliding members 49 approach the position shown in Figure 13 (moving from the extreme left towards the centre), they engage a sliding member 106ª and imparts a longitudinal movement thereto releasing catch 106 on the right and the spring catch 110 moves into engagement with the sliding member 49, when it reaches its normal position, the handle 105ª and the lever 105 returning to the normal position Figure 13, the bolts 301 on 195 (Figure 1) and partly shown in Figure 3 also return home under their own springs.

Figure 12:
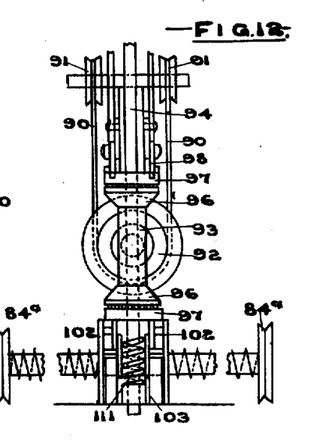
Figure 12 is a view to a larger scale of the driving mechanism and clutch employed for moving the change box within the camera in order to effect the removal or replacement of the covers for said change box.

The drum 84ª is driven from the shaft 94 by means of a worm 111 engaging a worm wheel 112 keyed to the drum shaft 84ᵇ (Figures 1 and 12).

During the movement of the sliding members 49 which form bearings for the rotary carrier, from side to side of the casing as just described, the end covers 44 on the change box 43 are brought successively into position against the side walls of the casing 40 to be removed or the end covers 44 are replaced as previously described.

The plate carrier 45 comprises a substantially rectangular box like casing open at each end and shaped to receive the change box 43 previously described. The bearing discs 47 are provided with stub axles 47ª on which are loosely mounted spirally toothed wheels or cams 113 arranged in pairs, one of each pair being located on each side externally of the casing or frame 40.

The inner pair of spirally toothed wheels 113 are adapted to engage pinions 114 connected to a sliding member 115 mounted to slide in guides in the frame 40 towards the front of the camera, whilst the outer pair of spirally toothed wheels 116 engage pinions 117 carried by a sliding plunger 118 mounted in similar guides towards the rear of the camera casing, or vice versa.

The periphery of each of the spirally toothed wheels 113 is formed substantially concentric to the axis of rotation over approximately half its circumference so that during the period that the corresponding pinions which mesh with said wheels are in engagement with this concentric portion, no sliding movement is transmitted to the sliding member at the front of the camera or to the plunger at the rear of the camera respectively, thus allowing the plate carrier to rotate.

The outer ends of the stub axles 47ª of the carrier are provided with similar operating mechanism for imparting intermittent rotation to the carrier, and the mechanism now about to be described with reference to one side, is to be understood as being duplicated on the opposite side.

The stub axles 47ª have rigidly secured thereto a disc or plate 120 having a ring 121 provided with recesses 122 (Figure 16) located at diametrically opposite points.

The spirally toothed wheel 116 carries a pivotal pawl 123 mounted on a pin 125 (Figure 16) and as the wheel 116 rotates (Figure 16) it carries the pawl 123 with it and consequently the carrier when the pawl 123 is in engagement with the forward end of either of the recesses 122, and means are provided whereby at the end of each revolution of the spirally toothed wheel the pawl 123 is disengaged from the end of the recesses and the spirally toothed wheels and the pawls 123 move round without the carrier during the first half of the next revolution, when the pawls 123 re-engage with the opposite recess 122 at the commencement of the second half of the latter revolution and move the carrier round with it.

In order to absorb shocks when the pawl 123 comes into contact with the slots or recesses 122, a catch 124 is provided consisting of a block connected at its front end by a suitable spiral spring 126 to a pin or stud 126ª fixed to the spirally toothed wheel 116, said spring 126 being housed in an annular channel 127. The rear end of the block 124 is provided with resilient spring forks 128, the ends of which form catches which engage in recesses in the sides of the pawl 123. The block 124 is pressed into engagement with the outer surface of the ring portion 121 of the disc by blade springs 129 so that when said catch block comes opposite to one of the recesses 122, it is pressed into engagement with said recess 122 and is retained, the pin or stud 126ª continuing its forward rotation and placing the spring 126 under tension, so that by the time the pawl 123 comes to a position to enter the forked end of the catch block 124, the tension of the spring 126 will be such that a braking action is imparted to the driven wheel 116 and also a preliminary rotation of the carrier is commenced, the block 124 and pin 171 (Figure 1) being withdrawn prior to the pawl 123 striking the block 124. When the pawl 123 enters the catch the carrier is rotated positively with the spirally toothed wheel in the same direction. As soon as the tail of the pawl 123 reaches the position indicated in Figure 1, the tail comes into contact with a stop 130 which is adjustably mounted on the casing, the pawl 123 is rocked about its pivot and the catch block 124 is withdrawn from the recess 122 with which it was previously in engagement, the rotation of the carrier thus being brought to rest and the forked ends of the catch block 124 opened out to release the same from the pawl 123 by a stationary elliptically shaped cam 131 and the catch 125 is carried forward in advance of the pawl 123 by the spring 126 until it reaches such a position as to engage with the other recess 122. At the same time the pawl 123 is returned to its normal position by its spring 125 (Figure 16) after its tail has passed the stop 130 and re-engages with the catch block 124 on completing a further half revolution of the spirally toothed wheel 113, and the same operation takes place when the pawl 123 again reaches the position just described. By this means, it will be seen that during each rotation of the member carrying the pawl 123, the rotary carrier is carried round through half a revolution during the first half of the revolution and remains stationary during the second half of the revolution, or vice versa. During these stoppages the plate sheaths 42 are either removed from the front of the pile or placed at the back of the pile, these operations taking place successively as now about to be described. As previously mentioned the mechanism just described is repeated on the opposite side of the casing if desired and the operations on each side take place synchronously.

Figure 24:
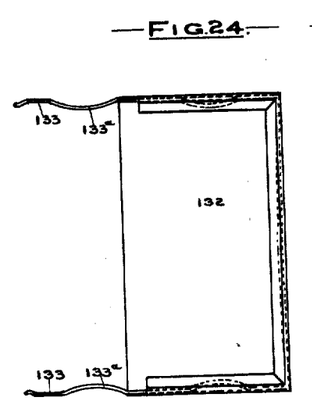
Figure 25:
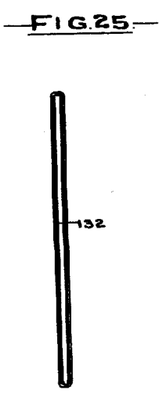
Figure 25 is an end view of Figure 24.
Figure 27:
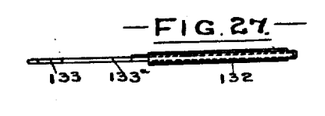
Figure 28:
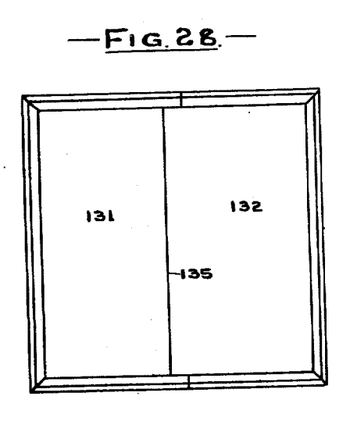
Figures 28 and 29 are views showing the outer casing of the sheath and the springy flexible gripping member in said sheath to frictionally retain the plate therein and also to interlock 133 with slot in 131.
Figure 29:
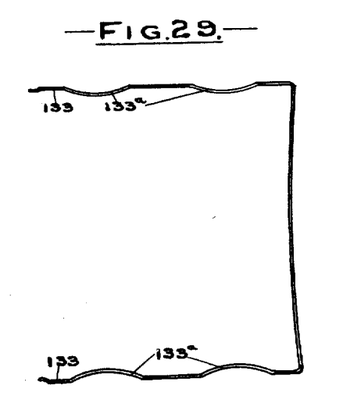

The plate sheaths 42, which are shown separately in Figures 23 to 29, are formed in two parts from sheet metal, indicated at 131 and 132 respectively. Each of the parts is provided with a channelled edge along three sides, and these channelled edges are adapted to house a blade spring 133 of substantially U shape which is fixed within the part 132 as shown in Figure 24, its ends projecting so as to slide within the open ends 134 of the channelled edges of the part 131. As will be readily seen from the drawings, the spring member 133 is provided with curved portions at 133ª in order to resiliently press against the edges of the plate which is inserted in the part 132 and the exposed edges of the plate are enclosed by attaching the part 131 to the part 132, the rear faces of the two members interlocking at 135, in the manner of a lap joint.

The plate sheaths 42 Figure 2 are retained within the holder by a pair of pivotal latches located on opposite sides and at both ends of the carrier. The pair of latches 140 at the front end of the carrier (Figures 2-19-22) are formed in the manner of pawls each being carried by a pair of arms 141 and having at the forward inner end transverse lip or projection which takes over the edge of the front plate sheath. Located between the arms of each latch and slightly inwardly of the lip thereon is a second latch 142 which, when the plates are in position, engages behind the edge of the outermost plate sheath as hereinafter more fully described. The inner face of the outer latch 142 on each side is formed with a curved cam like surface 143 and means are provided whereby the sliding plunger 118 is brought up to the front end of the carrier (Figure 2) to open the outer latches 140 so as to enable the outermost plate sheath to be gripped and withdrawn from the plate carrier at the appropriate time.

The plunger 118 carries a frame member the opposite side edges of which are provided with two spring pressed latches 144 Figure 2, said latches co-operating with one another in a manner hereinafter described. These latches are adapted at appropriate times to pass into the end of the rotary plate carrier to press, (when the plunger 118 moves up to the front end of the carrier, which has received half of a revolution), the outer spring latches 140 thereon outwardly, and to grip the edge of the outermost plate sheath 42, so that when the plunger is withdrawn, the plate sheath 42 is withdrawn with it. The plunger 118 is provided with an inner pair of latches 145 which act as retaining pawls for the plate sheath.

The opposite open end of the rotary carrier is provided with a pair of spring controlled latches 146 as previously described. These latches 146 are also each mounted at the ends of a pair of arms 147, and the outer faces of these latches 146 are curved inwardly towards their free ends at 148, so that when the spring plunger 118 carrying the plate sheath 42 previously removed from the opposite open end of the carrier (that is the front) comes into contact therewith, said outer latches 144 on the plunger 118 are pressed outwardly (Figure 20) to release their grip on the plate sheath 42, the plunger 118 moving forwardly to such an extent as to press the plate sheath 42 into the open rear end of the carrier, and when the plunger 118 is again withdrawn the outer spring latches 146 on the carrier engage the edges of the plate sheath 42 to retain the same in position, the film side of the plate being outermost.

Figures 19, 20:
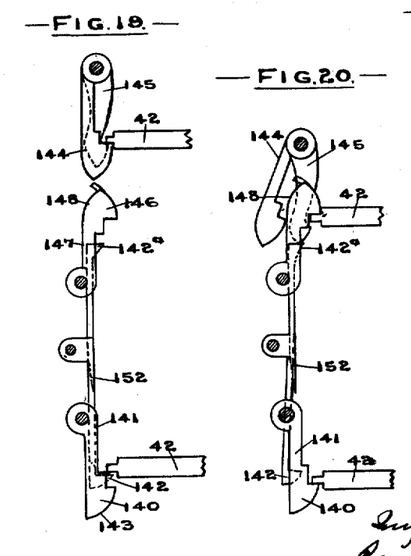
Figures 19, 20, 21 and 22, are detached views showing the operation of the latches on the rotary carrier or change box and the slidable plunger at the rear of the camera casing.
Figure 21:
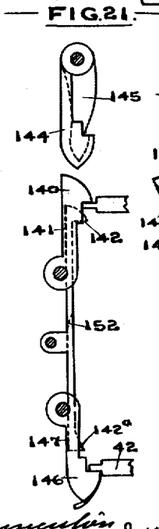
Figure 22:
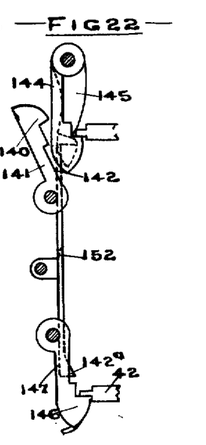
Figures 23, 26:
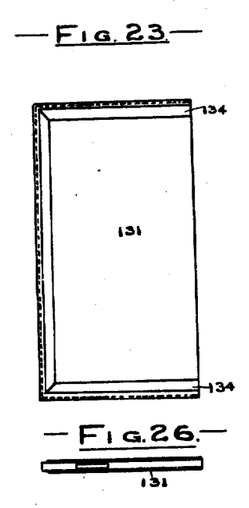
Figures 23 and 24 are front elevations of the two parts of one of the plate sheaths.
Figures 26 and 27 are edge views of Figures 23 and 24.

As previously described, the plate sheath 42 at the front of the pile, that is the sheath carrying the plate about to be exposed, is gripped on its front opposite edges by the outer spring latches 140 on the carrier and is supported at the rear by the inner spring latches, those inner latches also serving the purpose of retaining the remaining plate sheaths 42 in position in the carrier as shown in Figure 19. It is obvious therefore, that when the plate as just exposed has been withdrawn, it is necessary to advance the whole pile of plates forwardly in the carrier the distance of one sheath. This is effected in the following manner. At the rear of or behind the inner spring latches 142 on the front end of the carrier or change box 43 are members 145 having a sliding movement in the walls of the carrier, and the inner ends of these members have elongated tongues having at their ends cam surfaces 152 which engage inclined surfaces on the pivoted ends of the inner latches 143 at the front end of the carrier. By this means, when the spring controlled plunger 118 approaches the rear end of the carrier, the retaining spring latches 145 on the plunger 118 engage the ends of the slidable member 142 on the plate carrier and in moving the last mentioned members inwardly, the cam surfaces 152 thereon engage the inner latches at the front of the carrier and move the free ends thereof outwardly (Figure 20) thereby permitting the foremost plate sheath 42 to move forward to engage the outer latches 140 at the corresponding end of the carrier, these latches 140 being locked against outward movement by overlapping flanges 297 on the slidable member 115 (Figure 2), the forward movement of the plunger 118 moving the plate sheath 42 carried thereby into the rear end of the carrier and assisting this forward movement of the pile of plate sheaths 42.

As previously described, the motors 85 are adapted to drive a centrally disposed toothed wheel 87 in a constant direction. This toothed wheel drives through a toothed wheel (not shown) pinions 160 mounted at the upper ends of the shafts 161, the lower ends of which have keyed thereto worms 162 which engage a worm wheel 163 mounted on a shaft 164. The shaft 164 carries a toothed pinion 165 which engages a large toothed wheel 167 which is mounted on the trunnion disc bearing 47 of the rotary carrier and is fixed to and rotates with the spirally toothed wheel 116. This driving mechanism is duplicated on the opposite side of the camera casing so that the carrier is driven at appropriate times from opposite sides synchronously.

Each of the toothed wheels 167 has fixed thereto a disc 168 the outer periphery of which forms a cam surface 168ª which operates upon a pivotal spring controlled lever 169 carrying a roller 170. The lever 169 is adapted to operate a locking pin 171 in the wall of the camera casing said pin being carried by a blade spring 172 or spring operated arm so that when the carrier reaches the end of its half rotation hereinbefore described, the locking pin 171 is moved through the wall of the casing to pass into a recess in the carrier and lock the same against movement, said locking pin 171, being again released by the cam surface 168ª immediately prior to the commencement of the further rotary movement of the carrier. This locking mechanism is also duplicated on the opposite side of the camera casing to engage the opposite wall of the rotary carrier.

In order to bring the operating mechanism for the movement of the change box 43 into operation at the proper time, that is when the whole of the plates for which the change box 43 is constructed, have been exposed, counting mechanism is provided through which said operating mechanism for the lateral movement of the change box 43 is operated.

This is effected by providing an under flange or shoulders of one of the spirally toothed wheels with a pin or projection 180, see Figure 1, which once during its revolution strikes a tooth of a star wheel 181 which in turn engages through a pin 182 thereon a toothed bevel wheel 183 having fixed thereon a ring 184 provided with a peripheral cut away sector. Bearing against the ring, is a spring pressed axially movable rod 185 having a pin attached thereto and acting in a similar manner to the locking pin 171, and when the bevel wheel and ring have been rotated through a predetermined distance dependent upon the number of plates to be exposed, the rod is released the end thereof engages the recess in the ring and locks the rotary carrier in the position ready for the previously described movements of the change box 43. The movement of the rod also serves as a contact maker and breaker, breaking the main current and switching on a current through magnets 191 which draw down the ring 192 (this ring has freely mounted upon it one or more toothed wheels), thus throwing out of gear the intermediate toothed wheels between the toothed wheel 87 and the shafts 16. On raising the axially movable rod 185, the current through the magnets is broken and the gear wheels again which are mounted freely upon the ring enter into mesh with the toothed wheel 87 by means of spring pressure upwards (not shown).

The bevel wheel 183 meshes with a bevel wheel 194 mounted on the lower end of a shaft 195, the upper end of which carries a bevel wheel 196 engaging a similar wheel 197 to which is fixed a toothed wheel 198 meshing with a counting wheel 199, this latter wheel being provided with markings corresponding to the number of plates for which the change box 43 is designed and having a handle 200 by means of which the same may be set when the change box 43 is inserted, or by which the disc 183 may be rotated to bring the magnetic clutch into operation when the required number of plates have been exposed.

Figure 16:
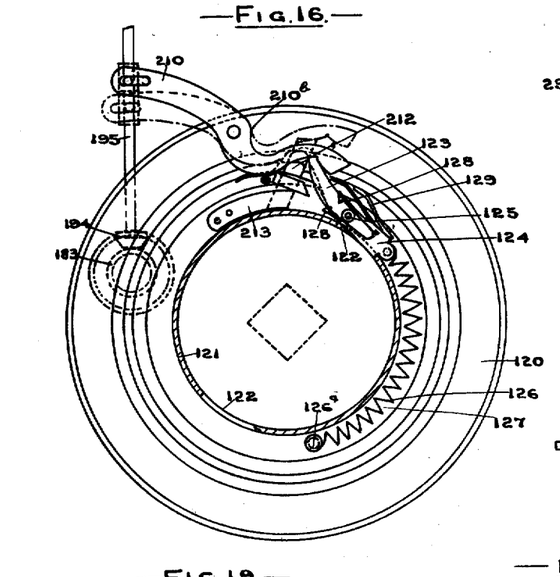
Figure 16 is a detail view showing the mechanism through which the rotary carrier is given its intermittent rotation.

210 is a manually operated pivotal lever mounted on a stud 211. This lever is mounted in such a position that when the change box 43 reaches a position in which its ends face the wall of the casing against which the covers are retained, it enables the pawl 123 to be disengaged together with the catch 124 from the ring 121, so that the sliding member 49 carrying the change box 43 is able to move from side to side within the camera casing. This is necessary as in the lateral movement of the change box, the large toothed wheel 167 is partially rotated and this rotation in an anticlockwise direction would not be possible if the pawl 123 and the catch 124 were not disengaged from the ring 121 of the disc 120. In this connection the pawl is brought to a position shown in Figure 16 when the ends of the change box 43 are in position to move laterally, so that the depression of the lever 210 to the position shown in full lines (Figure 16) enables the sliding members 49 and the change box 43 together with the spirally toothed wheels 113 to move laterally with respect to the casing. In so moving the pawl 123 is rocked by the engagement of the tail thereof with the end of the lever 210 and in so rocking the pawl 123 is caught and retained by a pivotal catch 212 controlled by a blade spring 213 which takes place when the change box 43 moves to the right (Figures 1 and 16). During the movement of the change box 43 from right to left, the head of the catch 212 passes over the nose of the depressed lever but strikes the shoulder of the said lever at 210$^b$ which allows the pawl 123 to be retained by the catch 212 until the sliding member 49 passes its central position, and is depressed thus freeing the tail of the pawl 123 from the catch 212. When the change box 43 again moves from its maximum position on the left to its central position, (Figure 1) the pawl 123 and the catch 124 which is still connected thereto reengage with the recess 122 of the ring 121 ready to impart rotation thereto.

The lever 210 (see Figures 1 and 16) is operated by a hand lever or the like 210$^a$ which is pivoted on a bracket 300 and is also adapted to withdraw a locking bolt 301 which normally engages the sliding member 49 and secures the same against movement.

The sliding member 115 (Figure 3) at the front end of the camera is operated during its outward movement, that is away from the change box 43, by the spirally toothed wheels 113, and its inward movement is effected by means of springs 220. The springs 220 are preferably four in number and are located at the four corners of the frame 40, and are each attached at one end to the sliding member 115 and at the rear end to the frame 221, see Figure 1, or the springs 220 may be connected to the sliding plungers 118.

Figure 5:
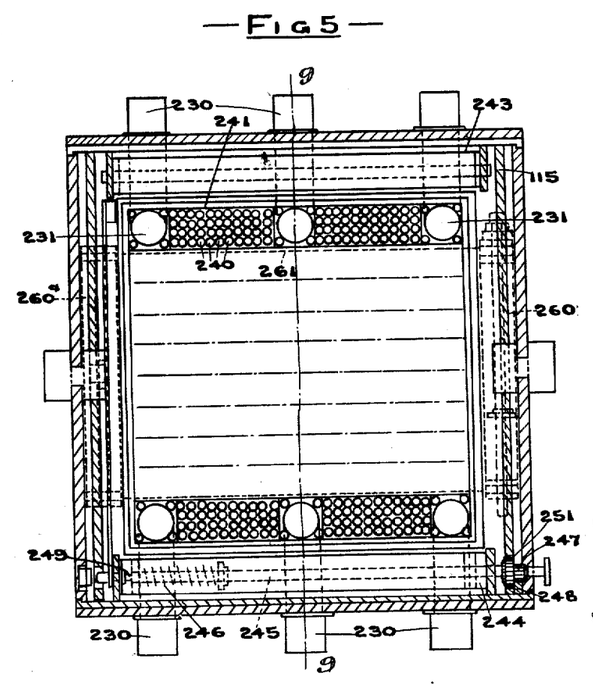

A further important feature of the present invention consists in an arrangement whereby each photographic plate exposed is adapted to record technical and other information, such for instance as time, data, altitude, number, inclination and the like, this data being photographed from technical and other instruments attached to the outside of the camera. This may be effected by directly photographing the instruments or parts thereof or by reflection. The data is photographed by providing a number of small auxiliary lenses 230 (Figure 5) attached on either side of the frame of the camera. These lenses are mounted so that when the sliding member 115 moves into contact with the front of the change box 43 passages 231 in the sliding member 115 having reflectors 232 register with the auxiliary lenses 230 so that when the shutter is operated, the desired record is photographically recorded on the plate (Figure 2).

Further it is proposed to employ a series of miniature lenses 240 more, or less arranged in sets, the lenses being either of different foci and located at uniform distances from the surface of a mask carried by the sliding member, 115 (see Figure 4) or alternatively, the lenses are of uniform foci and are mounted at different distances from the surface of the mask. The miniature lenses 240 are carried on the sliding member 115 at the forward end of the camera on which the shutter is mounted. The lenses 240 are arranged to give focus only of its corresponding field on the main photograph, and the data produced by the lenses or sets of lenses 240 on the plates are photographed preferably along two sides (see Figures 2-5-9), such for instance as the top and bottom. By this means the lenses 240 operate as what may be termed range finders. For example, if one lens is a set as constructed to give a sharp focus at say 250 feet from the camera and the other lenses in the set to give a sharp focus at gradually increasing distances and the aneroid barometer gives a reading of 1000 feet when a photograph is taken over hilly country, it follows that if a sharp photograph image is given by the lens having the 250 feet range that that corresponding portion of the ground photographed in the main photograph will be in the neighbourhood of 750 feet high.

It is to be understood that the mask 241 containing the miniature lenses may be removable from the sliding member when the apparatus is not required for surveying work, but is however intended at all times to employ the larger auxiliary lenses for recording the readings of aeronautical and other instruments either within their own masks embodied in the main mask or without their masks giving their images in conjunction with the main photograph. Thus the compass reading or needle pointer may be photographed directly on to the photograph at the same time as the main photograph is taken. Preferably one focal plane shutter 242 is employed to photograph all the recorded data.

Figure 4:
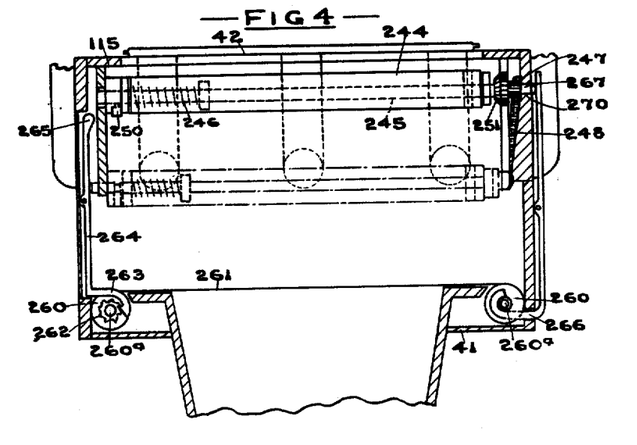
Figures 4 and 5 are sectional elevation and sectional plan respectively showing the means for operating the focal plane shutter, and the arrangement of auxiliary and miniature lenses on the sliding carrier at the front of the camera.

The movement of the sliding member 115 towards the front of the camera in which the main lens is mounted is adapted to wind the shutter 242 which is mounted on rollers 243 and 244. The rollers 243 is a spring roller whilst the roller 244 is mounted on an axially movable shaft 245 controlled by a spring 246 which normally tends to urge the shaft to the right in Figure 5. The right hand end of the shaft carries a toothed pinion 247 which meshes with an inclined toothed rack 248 (Figures 2, 4 and 5) so that as the sliding member 115 moves forwardly not only is the roller 244 rotated to wind the blind thereon, but the shaft 245 is moved axially to the left until an annular groove 249 in the shaft registers with a spring catch 250. (Figure 4.) The shaft 245 also carries a ratchet member 251, which when the shaft 245 has been moved axially to engage the catch 250 with the groove 249 (dotted lines Figures 4 and 5), engages a co-operating pawl locking the ratchet against unwinding (not shown) on the bracket carrying the roller 244. By this means when the sliding member 115 has reached the end of its outward movement, the shutter will be wound, ready for operation. On the return movement of the sliding member 115, the pawl of the ratchet 251 is caught by a pin on the front of the change box 43, the roller 244 is thus free to rotate under the action of the spring in the roller 243 thus effecting the exposure. The shutter is provided with a projection which after the exposure has been made engages and releases the catch 250 so that the shaft 245 moves to the right under the action of its springs 246.

The sliding member 115 is also provided with an inclined rack (not shown) which meshes with a toothed pinion on one end of the roller 260 of the safety shutter 261 (see Figure 4). The other roller or shaft 260ª carries a ratchet wheel 262 with which co-operates a pawl 263 mounted on one end of a lever 264, the opposite end 265 of which is located in the path of the end of the shaft 254. In moving towards the front wall of the camera, the rack on the sliding member engages the toothed pinion on the shaft 245 winding it exactly in the same manner already described with reference to the main shutter, and the rotation of the shaft 245 winds a spring until by the time the sliding member reaches the end of its forward travel, the shaft 245 has been moved axially within its roller, and the shutter material 261 is retained by the pawl 263 co-operating with the ratchet thereon. The shaft is also retained in its axially moved position by the member 266 which engages a groove on the shaft 245. The opposite end of the pivoted member 266 carries a pin 270 located in an opening 267 in the casing which is registered with the end of the axially movable shaft 245 of the main shutter. By this means, when the sliding member 115 moves towards the change box 43, the projecting end of the shaft 245 engages the end 265 of the member 264 and releases the pawl from the ratchet wheel mounted on the roller 260 on shaft 260ª thereby permitting the tensioned safety shutter 261 to open as the sliding member reaches the change box 43. When the sliding member reaches the change box 43 the catch co-operating with the ratchet 251 is released the main shutter operates under the action of the spring in the roller 243 (see Figure 2). After the shutter 242 (Figure 2) has again closed, the projection on the blind of the shutter operates the catch 250 releasing the shaft 245 which now moves axially to the right, the right hand end of the shaft 245 being projected against the pin 270 (on one end of the member 266 and passing through in the wall of the casing) which in turn disengages the member 266 from the grooved shaft 260ª so that the latter may move axially to its normal position under the action of its compression spring, the ratchet 251 being at the same time released from its pawl, the roller is operated by the tensioned spring in the other roller the one on shaft 260 having being released.

Figure 11:
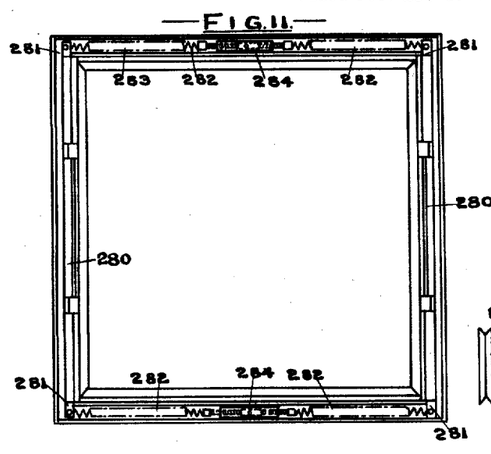
Figure 11 shows a modified method of construction of the carrier or change box.

The pivotal and sliding catches on the change box or rotary carrier are normally retained in engagement with the sheaths by means of blade springs, which however for the sake of clearness are not shown in the drawings, I may however provide the arrangement shown in Figure 11 for controlling the catches this veiw shows one of the open ends of the change box 43, and the latches are located on the top and bottom walls 280, 280. The outer edges of the latches are provided with projections 281 which are connected to springs 282 located within the walls 283, 283, respectively of the change box the inner ends of the springs being connected to an adjustable member 284 serving to enable the spring tension to be adjusted.

Figures 9, 10:
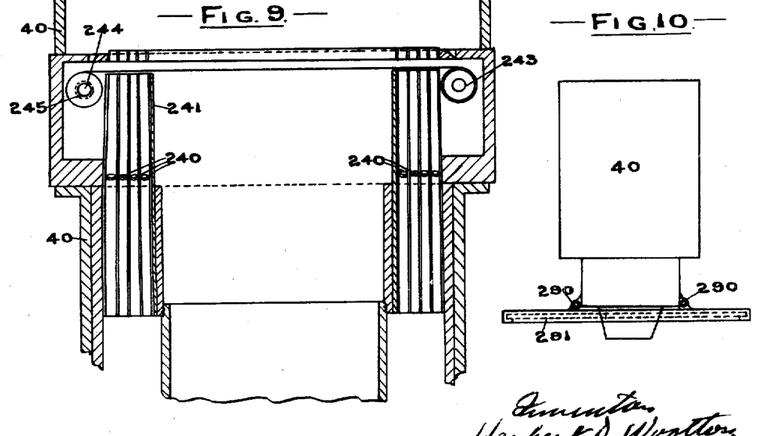
Figure 9 is a transverse section taken on line 9—9 of Figure 5.
Figure 10 is a view showing diagrammatically one method of supporting the camera.

The camera may be supported in the aerial machine or vessel to which it is fitted by any suitable means. For example, as shown in Figure 10 the camera is provided at its front and rear ends with lugs on opposite sides co-operating with lugs 290 on the floor 291 or other portion of the aerial machine, the lugs being secured together by removable pins.

Figure 17:
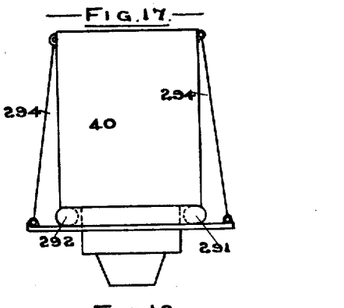
Figures 17 and 18 show diagrammatically modified methods of supporting the camera.
Figure 18:
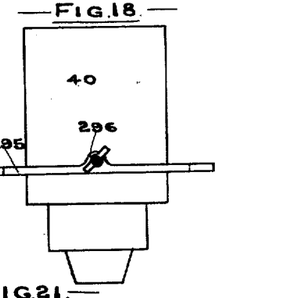

In the construction illustrated diagrammatically in Figure 17 the camera rests upon air cushions or the like 292, the front portion of the camera projecting through an aperture in the floor or the like 291 of the aerial machine and being held in position by stays 294 preferably connected to the camera and or to the floor by means of springs (not shown). In the construction shown in Figure 18, the camera is supported on pivots in a frame member 295, the method of support being such that the camera may be tilted or inclined bodily by adjusting the retaining screws 296, one of which is shown in the figure, the opposite screw being located on the opposite side.

It will be understood that although I have described in detail the construction of the various minor parts of the apparatus that such parts may be replaced by others best suited for the purpose without departing from the principle of the invention. The driving means for the various parts may be replaced by any other suitable transmission mechanism such as worm drive, rack and pinion gearing and the like.

What I do claim as my invention, and desire to secure by Letters Patent, is:—

1. An aerial or like camera comprising a rotary plate carrier, a removable and replaceable change-box associated with said carrier, a cover at each end of said change-box, and means for automatically removing and replacing said covers within the camera.

2. An aerial camera comprising a rotary carrier, a change-box, a movable member associated with said carrier, yieldable means for normally maintaining said member in its retracted position, a cam adapted to bear adjacent said member for engaging the latter with said change-box, sheaths in said carrier, plates mounted in said sheaths, spring controlled catches supporting said sheaths, and means successively operating said catches.

3. An aerial camera comprising a rotary carrier, a change-box, a movable member associated with said carrier, yieldable means for normally maintaining said member in its retracted position, a cam adapted to bear against said member for engaging the latter with said change-box, sheaths in said carrier, plates mounted in said sheaths and means for operating said carrier through half a revolution to permit the foremost plate sheath being withdrawn, and through a further half revolution to permit the insertion of the said plate at the rear.

4. An aerial camera comprising a rotary carrier, a change-box, plate carrying sheaths, a slidable plunger adapted to engage the plate sheaths to withdraw them successively from the front and means for subsequently operating the plunger to release said plate sheaths for insertion at the rear.

5. An aerial camera comprising a casing, a rotary plate carrier, a removable and replaceable change-box, covers at the ends of said change-box, means for moving said carrier laterally within the camera casing, and means for releasing said covers from said change-box and retaining them.

6. An aerial camera comprising a casing, a rotary plate carrier, a removable and replaceable change-box, end covers associated with said change-box, slots in said covers and means on the casing for cooperating with said slots to secure said covers.

7. An aerial camera comprising a casing, a rotary carrier, a change-box, plate carrying sheaths, a slidable plunger grip, toothed spiral wheels for operating said slidable plunger grip in one direction and springs for operating said grip in the opposite direction.

8. An aerial camera comprising a casing, a rotary plate carrier, a sliding member, means mounted co-axially with the axis of rotation of the carrier for operating the sliding member in one direction and means for returning said member.

9. An aerial camera comprising a casing, a rotary plate carrier, a removable change box, means for imparting intermittent rotation to said carrier, means for withdrawing each plate successively from the front and replacing said plate to the rear, means for effecting the exposure of each plate, a sliding member in the bottom of said casing, said sliding member having reflectors thereon, a series of lenses adapted to register with said reflectors when the sliding member is moved in a predetermined position for photographically recording aeronautical data simultaneously with the exposure of each of the plates.

10. An aerial camera comprising a casing, a plate carrier, a sliding member in front of the carrier, a focal plane shutter on said member, means for winding said shutter during the movement of the sliding member towards the front of the camera, and means for operating said shutter when the sliding member is brought into engagement with the carrier.

11. An aerial camera, comprising a casing, a rotary carrier within said casing, a removable change box, plates mounted in said carrier, means for imparting intermittent rotation to said carrier, means for withdrawing each plate successively from the front and for replacing said plate at the rear, means for effecting the exposure of each plate located in the correct focal plane, and a safety shutter adapted to be operated by the movement of the sliding member at the front of the camera.

H. D. WOOTTON.